US005610687A

United States Patent [19]

Bogdanowicz et al.

[11] Patent Number: 5,610,687
[45] Date of Patent: Mar. 11, 1997

[54] SYSTEM AND METHOD FOR FADE AND DISSOLVE EXPOSURE PROFILE CONTROL IN A MOTION PICTURE PRINTER

[75] Inventors: Mitchell J. Bogdanowicz, Spencerport; Richard C. Sehlin, Rochester, both of N.Y.

[73] Assignee: Eastman Kodak Company, Rochester, N.Y.

[21] Appl. No.: 352,010

[22] Filed: Dec. 8, 1994

[51] Int. Cl.$^6$ ............................................. G03B 27/72
[52] U.S. Cl. ........................ 355/80; 355/35; 355/77; 355/88
[58] Field of Search ..................... 352/91 R, 97, 352/79, 91 C, 91 S; 355/35, 32, 40, 46, 71, 80, 88

[56] References Cited

U.S. PATENT DOCUMENTS

| | | | |
|---|---|---|---|
| 3,040,619 | 6/1962 | Oxberry | 355/46 |
| 3,085,468 | 4/1963 | Hehn | 88/26 |
| 4,009,959 | 3/1977 | Watson et al. | 355/71 |
| 4,108,537 | 8/1978 | Watson et al. | 350/150 |
| 4,349,257 | 9/1982 | Friedman et al. | 354/126 |
| 4,355,888 | 10/1982 | Pearson | 355/32 |
| 4,359,280 | 11/1982 | Krause | 355/37 |
| 4,368,974 | 1/1983 | Coote et al. | 355/35 |
| 5,122,769 | 6/1992 | Schmoeger et al. | 355/32 |
| 5,184,175 | 2/1993 | Schmoeger et al. | 355/32 |

*Primary Examiner*—A. A. Mathews
*Attorney, Agent, or Firm*—Andrew J. Anderson

[57] ABSTRACT

Specially designed non-uniform filters allow for the flexible alteration of the exposure profile during a fade and dissolve process in a motion picture printer. In accordance with one aspect of this invention, there is provided a system for fading and dissolving two original color record scenes together on a light sensitive material, the system comprising: a) a first color record; b) a second color record; c) a motion picture printer comprising a light source, a fader, a non-uniform filter and an exposing slit; and d) a light sensitive material onto which the first and second color records can be illuminated by means of the light source. The non-uniform filter is non-uniform in one direction thereof with respect to its ability to filter light from the light source, and is positioned so as to alter the relative intensity and/or spectral characteristics of light trasmitted to the light sensitive material as the fader is opened and closed during a fade and dissolve printing process. Another aspect of the invention relates to a process for producing a fade and dissolve motion picture image using such a non-uniform filter. Use of non-uniform filters in accordance with the invention to selectively alter the exposure profile enables a film printer to compensate for speed changes in one or more of the sensitive layers of a photosensitive material during a fade and dissolve process.

20 Claims, 5 Drawing Sheets

5,610,687

SYSTEM AND METHOD FOR FADE AND DISSOLVE EXPOSURE PROFILE CONTROL IN A MOTION PICTURE PRINTER

TECHNICAL FIELD

This invention relates to a system and a method for controlling the exposure profile during a fade and dissolve step in the printing or production of a motion picture print film or intermediate negative. In a particular aspect it relates to a system and a method in which filters are used to modify the resulting neutral and/or individual color records of print film or intermediate negative obtained during a fade and dissolve print step.

BACKGROUND OF THE INVENTION

In editing films in the motion picture industry, it is common practice to join separately shot scenes together by copying an intermediate negative or printing a positive using a "fade and dissolve" technique. In a fade and dissolve, a first scene is "faded out" during copying or printing thereof by progressively lightening the scene images over a series of film frames while the second scene is "dissolved in" during copying or printing thereof by progressively darkening the scene images over a series of film frames, the two copied or printed series of faded out and dissolved in film frames being superimposed on a light sensitive recording element to form a resulting fade and dissolve scene change. The fade and dissolve can be performed during the production of an intermediate negative film produced from two original negative records, or it can be accomplished as a two exposure procedure on the final positive print material stock which is projected in a movie theatre.

Copying of an original negative record to make an intermediate negative, or printing of an intermediate negative record to give a positive is accomplished in a motion picture printer by illuminating the record to be copied with a lamp through an exposing slit so that radiation passing thru the record to be copied impinges on the light sensitive material in which the reproduction will be formed as the record to be copied and the light sensitive material are together passed by the exposing slit. In a fade and dissolve, the light sensitive material is conventionally subjected to two superimposed exposures wherein the light intensity is ramped down for one scene (the faded scene) and ramped up for the other (the dissolved scene), so the total illumination (i.e., the summation of the two exposures) remains essentially constant.

It is common practice to employ as the source of illumination an additive lamp house which supplies three separate portions of the visible spectrum; one which has its peak in the blue region of the spectrum, between about 400 and 500 nm, one which has its peak in the green region of the visible spectrum between about 500 and 600 nm, and one which has its peak in the red region of the visible spectrum between about 600 and 700 nm. The exposing radiation is conventionally provided by a single white light source which is split into three separate beams which are filtered with red, green or blue filters before they illuminate the record being copied. Typically each of the exposure sources, the dyes which provide the absorption in the record to be copied and the sensitivity of the light sensitive element onto which the copy is made are chosen so that their peaks approximately match.

FIG. 1 schematically illustrates the optical system of a conventional motion picture printer comprising a lamp house 10 having lamp 11, reflector 12, condensing lenses 13 and 14 and heat filter 15; a fader 20 having a fader slit opening 21 of variable width formed between opaque elements 22*a* and 22*b* (at least one of which is movable relative to the other); dichroic filters 31*a*, 31*b*, 31*c*, 31*d*, 31*e* and 31*f*; red light valve 32*a*, green light valve 32*b* and blue light valve 32*c*, which modulate individual red, green and blue channel intensities; focusing lenses 33*a*, 33*b*, 33*c* and 33*d*; condensing lenses 34*a*, 34*b* and 34*c*; filter holder 35; and exposing slit 40, which is conventionally transversly aligned with the direction of film transport past the exposing slit. Film 50 comprising color record scenes and light sensitive material film 60 are also schematically depicted passing by exposing slit 40. A representative mechanical aperture for an exposing slit is 0.234 inch, while a representative optical aperature is 0.187 inch (i.e., the focussed width of the exposing light at the plane of the exposing slit).

Various types of filters have been used with printers to modify reproductions. Hehn U.S. Pat. No. 3,085,468 describes the use of dichroic filters in printing photographic originals in place of the red, green and blue filters commonly used in additive printing systems. Krause U.S. Pat. No. 4,359,280 describes the use of dichroic filters, and other narrow band filters to modify contrast by shifting peak intensity characteristics of the light modulated by the record being copied. Uniform wide band filters, such as Kodak Gelatine Filters, Wratten filters and custom filters made from organic or inorganic dyestuffs are also conventionally used to modify exposing light compositions for various printing purposes.

To control the illumination during the fade and dissolve exposures, motion picture printers conventionally include a "fader" which controls the intensity of the light passing into the red, green and blue filter areas of the printer. Such a fader is illustrated at 20 in FIG. 1. The optics of a motion picture printer are conventionally designed to image the fader slit edges in its open position at the plane of the final exposing slit of the printer as illustrated at 40 in FIG. 1. As the fader slit opening is closed, the width of the slit imaged onto the final exposing slit is narrowed and the intensity of light received by a film frame passing thereover at a constant rate is therefore reduced. A combination of factors can influence the summation of the two exposures generated in a photosensitive material in a fade and dissolve procedure, including: the preprogrammed exposure profile of the fader in a motion picture printer; the time between the two exposures (latent image keeping); mechanical and optical properties of the printer; and properties of the photosensitive material.

While fade and dissolve exposures are conventionally programmed so that the sum of the exposures remains constant throughout the fade and dissolve in order to avoid overall image density changes, it has been found that certain photosensitive materials, such as many commercially available motion picture print stocks, may record two separate superimposed exposures such that there is an effective speed change in one or more of the sensitive layers relative to a single exposure of equivalent intensity. Such speed changes, along with the above mentioned factors, can result in objectional color shifts or image density changes in the resulting recorded image which are evident to a viewer of a fade and dissolve transition scene. It would be desirous to be able to correct for such speed changes without having to adjust the programmed exposure profile of the printer's fader or the mechanics and optics of the printer. Further, it would additionally be desirous to control the density profile or color balance during the fade and dissolve process for artistic considerations without resorting to such adjustments.

SUMMARY OF THE INVENTION

We have found that use of specially designed non-uniform filters in a motion picture printer allows for the flexible alteration of the exposure profile during a fade and dissolve process.

In accordance with one aspect of this invention, there is provided a system for fading and dissolving two original color record scenes together on a light sensitive material, the system comprising: a) a first color record; b) a second color record; c) a motion picture printer comprising a light source, a fader, a non-uniform filter and an exposing slit; and d) a light sensitive material onto which the first and second color records can be illuminated by means of the light source; wherein the non-uniform filter is non-uniform in one direction thereof with respect to its ability to filter light from the light source, said filter being positioned so as to alter the relative intensity and/or spectral characteristics of light trasmitted to the light sensitive material as the fader is opened and closed during a fade and dissolve printing process.

In another aspect, this invention relates to a process for producing a fade and dissolve motion picture image, comprising the steps of: a) providing a first color record; b) providing a second color record; c) providing a light sensitive material onto which the first and second color records can be illuminated; and d) sequentially illuminating at least a portion of each of the first and second color records onto a portion of the light sensitive material with a motion picture printer light source, to form two superimposed exposures in the light sensitive material wherein the light intensity during the illumination is ramped down for one of the color records and ramped up for the other color record by controlling the width of a fader slit opening in the motion picture printer; wherein a non-uniform filter which is non-uniform in one direction thereof with respect to its ability to filter light from the light source is positioned so as to alter the relative intensity and/or spectral characteristics of light trasmitted to the light sensitive material as the fader is opened and closed during a fade and dissolve printing process.

Use of non-uniform filters in accordance with the invention to selectively alter the exposure profile enables a film printer to compensate for speed changes in one or more of the sensitive layers of a photosensitive material during a fade and dissolve process relative to speed obtained from a single exposure at an intensity equivalent to the summed exposure of the fade and dissolve, thereby minimizing objectional color shifts and image density changes in the resulting recorded image, without requiring a timing change of the light valves during the fade and dissolve exposures or a software change of the preprogrammed exposure profile of the fader.

For the purposes of this invention, the term "color record" is intended to encompass black and white color records as well as full color records. In preferred embodiments of this invention, each color record has two or more sub-records with wavelength peaks in different regions of the electromagnetic spectrum. In the most preferred embodiments of the invention, the color records are comprised of cyan, magenta and yellow sub-records; the light sensitive material is sensitized to the red, green and blue regions of the spectrum; and the non-uniform filter comprises sections of different filtering ability, where the filtering ability is uniform throughout each section.

DETAILED DESCRIPTION

Figure 1:
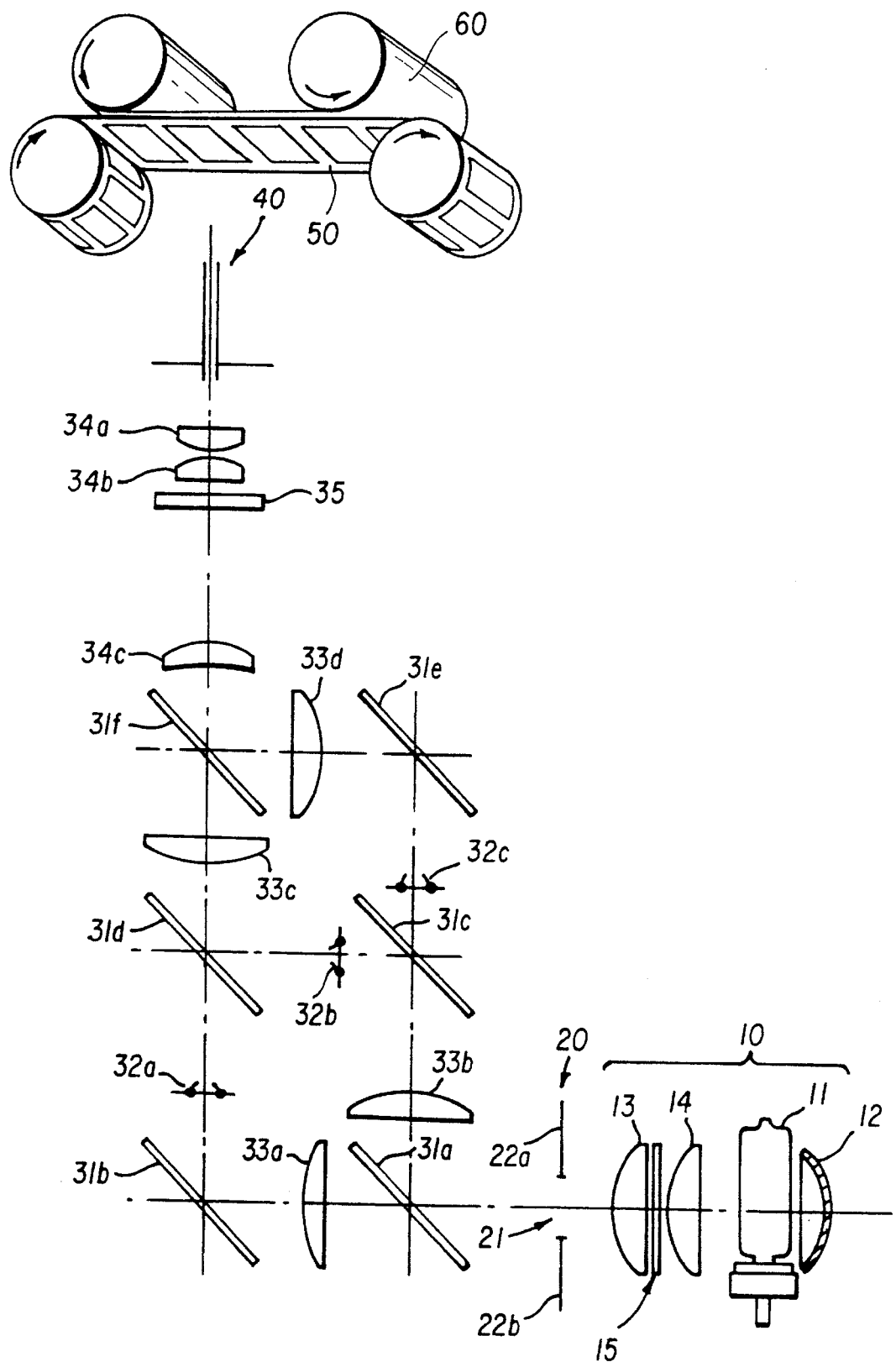
FIG. 1 is a schematic illustration of the optical system of a motion picture printer for use in accordance with the invention.

FIG. 1 represents the optical system of a conventional continuous transport motion picture printer. Other modifications of this design exist and the invention will be applicable thereto. In this printer, the fader slit edges are imaged at the plane of the final exposing slit. As the fader 20 is closed, the intensity of the light passing into the dichroic filter area of the optical system is reduced and the width of the slit imaged onto the final exposing slit 40 is narrowed. The combination of these effects, and any preprogrammed hardware effects, generate the exposure profile during the fade and dissolve.

In this invention, a non-uniform filter is placed between the light source of a printer and the light sensitive element being printed. The non-uniform filter is preferably, and conveniently, placed in a filter holder conventionally provided near the final exposing slit (as illustrated at 35 in FIG. 1), although it may be placed at other locations within the printer, such as on either side of the fader slit opening. The construction of this filter and its positioning is such that the intensity or the spectral quality of the exposing light will change as the fader slit is decreased during a fade and/or dissolve in relation to the intensity and spectral quality of the light which would be obtained during a fade and/or dissolve in the absence the non-uniform filter. The change is preferably continuous during the fade, but may also be a stepped balance change.

The invention comprises of the use of a filter which is non-uniform in terms of its ability to filter light along one direction thereof in a continuous motion picture printer in which two color records (e.g., present in film element 50 of FIG. 1) to be faded and dissolved together are sequentially passed over an exposing slit along with a photosensitive material, (e.g., film 60 as illustrated in FIG. 1) to form two superimposed exposures in the photosensitive material wherein the non-uniform direction of the filter is aligned in the printer to control the ratio of filtered area to non-filtered (or less filtered) area through which light passes in response to changes in the fader slit opening. Preferably, the filter is uniform in the other direction (along the width of the filter) to assure exposure uniformity across the exposing slit. The non-uniformity of illuminating light resulting after passing through the filter is in the direction of travel of the color records and photosensitive material over the exposing slit, and is thus uniformly integrated into the exposed photosensitive material as it passes by the exposing slit. The effect of using this device is to change the fade/dissolve exposure profile by altering the ratio of the filtered to non-filtered area of the filter which will pass light by the imaging of the fader slit.

Figure 2A:
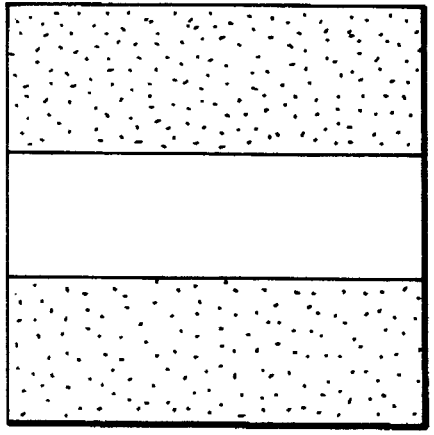
FIGS. 2a and 2b are illustrations of non-uniform filters in accordance with the invention having uniform filter areas.
Figure 2B:
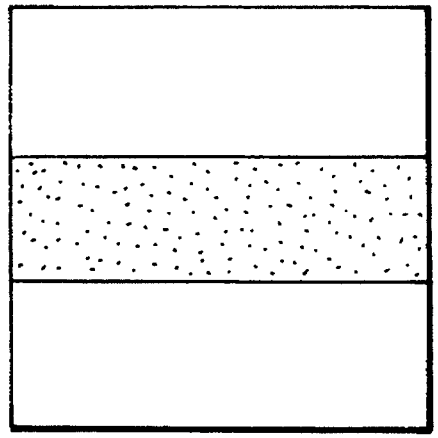
Figure 3A:
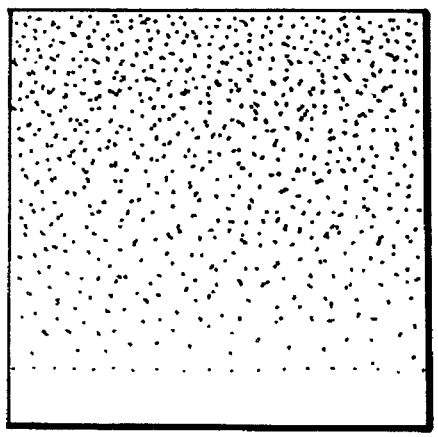
FIGS. 3a and 3b are illustrations of non-uniform filters in accordance with the invention having gradient filter areas.
Figure 3B:
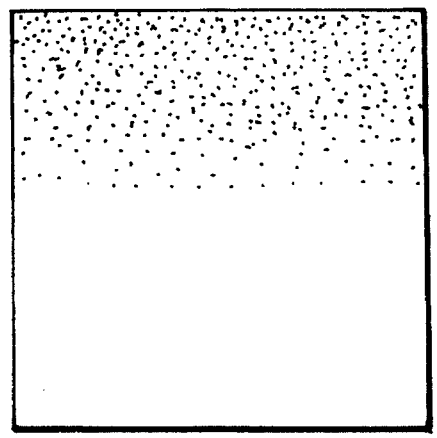

The non-uniform filters may have a uniform filter area either on the ends or in the center, in accordance with FIGS. 2a and 2b. The filters may also have a filter area along the entire length, or any portion thereof, which is a gradient (constantly changing density from high density to low density), in accordance with FIGS. 3a and 3b. Placement of a higher filter density on the ends results in the increase of the exposure in middle of a fade/dissolve, while placing a higher filter density in the center will decrease the exposure in the middle of the fade/dissolve. Various other placements of non-uniform filter densities and combinations thereof are possible which may further alter the shape of the exposure profile.

Figure 4:
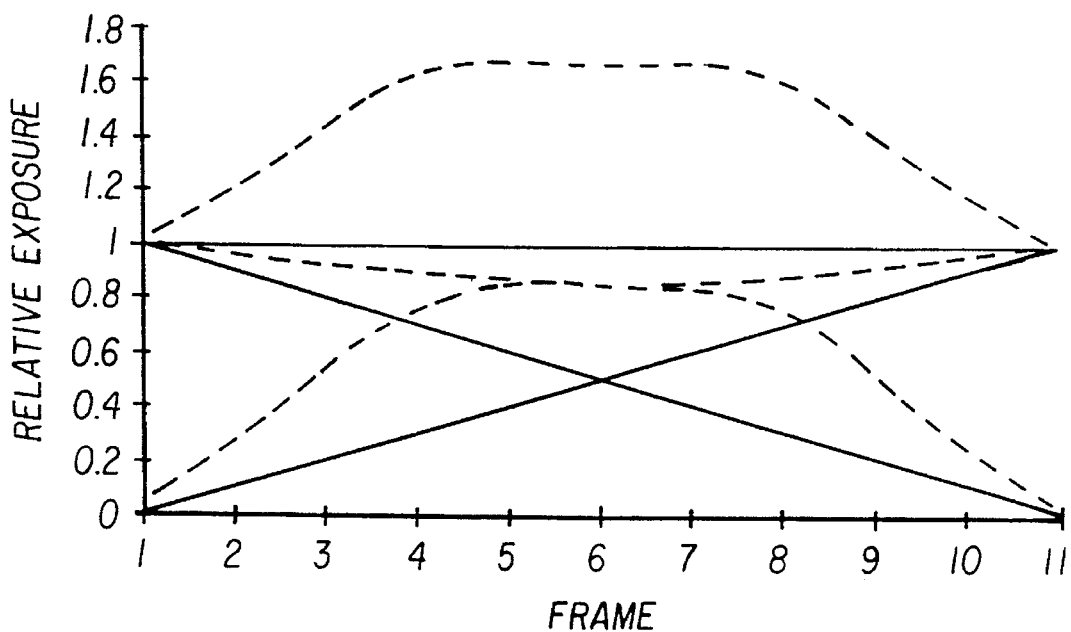
FIGS. 4 and 5 are graphs depicting relative exposure over an 11 frame fade and dissolve with and without the use of non-uniform filters in accordance with the invention.

FIG. 4 represents two different fade/dissolve conditions. The slanted solid lines are the relative exposure curves for a linear fade/dissolve without a filtration device. The solid horizontal line is the sum of the two slanted lines. This illustrates that the combination of each individual exposure is uniform throughout a linear fade/dissolve without a non-uniform filter. The dotted set of curves in FIG. 4 are the result of a non-uniform filter (with 1.0 Neutral Density (ND) incorporated onto approximately the ⅓ outer ends of the filter leaving the center ⅓ of the filter clear as illustrated in FIG. 2a) used in a fade/dissolve. Note the profile of the slanted dotted lines compared to the solid dotted lines. The dotted lines are always above the solid lines, thus the summation of the dotted slanted curves results in a new curve which is higher in relative exposure than the horizontal solid line obtained from a linear fade/dissolve. The extent of filtration (amount of filter used in area) and the density of the filtration will determine the shape of the combined curve as well as its magnitude.

Figure 5:
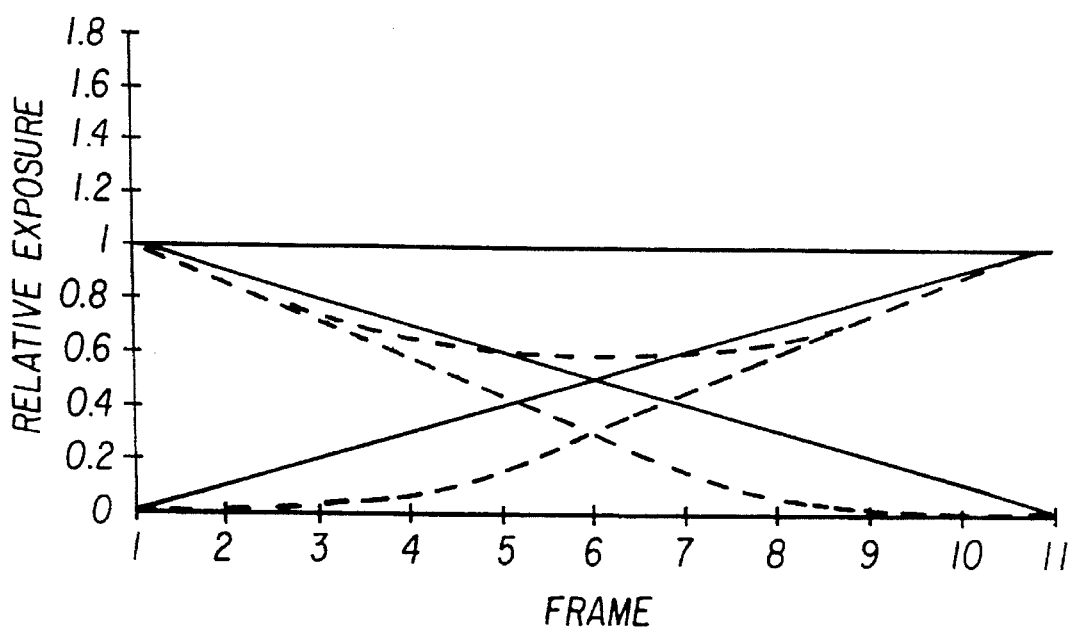

FIG. 5 also represents two different fade/dissolve conditions. As in FIG. 4, the slanted solid lines are the relative exposure curves for a linear fade/dissolve without a filtration device, and the solid horizontal line is the sum of the two slanted lines. The dotted set of curves in FIG. 5, however, are the result of a non-uniform filter (with 1.0 ND incorporated onto approximately the center ⅓ of the filter leaving the ⅓ ends clear) used in a fade/dissolve. Note the profile of the slanted dotted lines compared to the solid dotted lines. The dotted lines are always below the solid lines, thus the summation of the dotted slanted curves result in a new curve which is lower in relative exposure than the horizontal solid line obtained from a linear fade/dissolve. Again, the extent of filtration and the density of the filtration will determine the shape of the combined curve as well as its magnitude.

Figure 6:
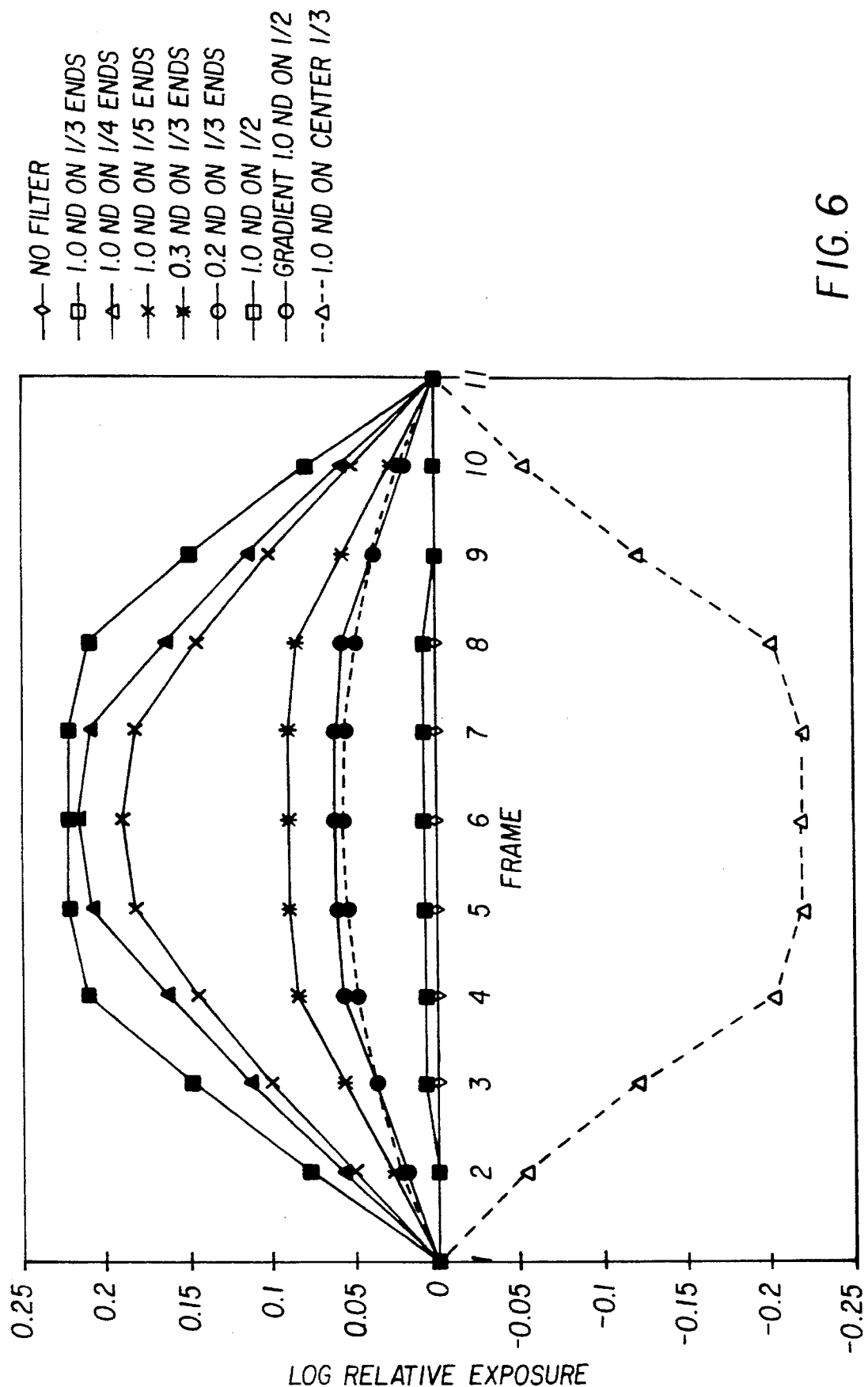
FIG. 6 is a graph depicting log relative exposure over an 11 frame fade and dissolve with and without the use of non-uniform filters in accordance with the invention.

A further illustration of the effect within a fade and dissolve is shown in FIG. 6. The "no filter" position in a normal linear preprogrammed fader setup results in the straight line at 0.0 Log Relative Exposure. The top three curves are from filters with the density on the ends extending in at various positions. The bottom curve is the result of a filter density placed in the center of the device. By varying the density and shape of the filter materials incorporated into the non-uniform filter, one may alter not only the magnitude of the effect but also the profile within the fade and dissolve.

Figure 7:
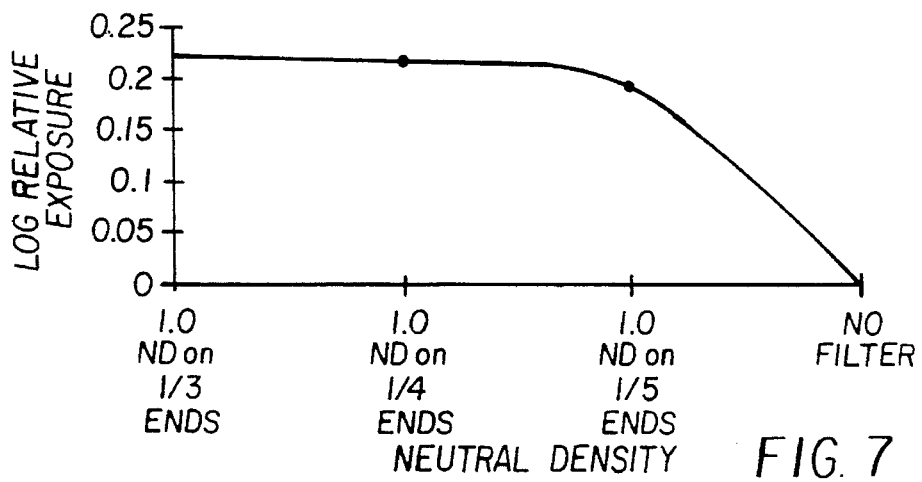
FIG. 7 is a graph depicting the maximum log relative exposure increase obtained with the use of certain non-uniform filters in accordance with the invention.

The maximum log exposure increase attained with a 1.0 ND filter material positioned at the ends of the filter at varying distances is shown in FIG. 7. There is a range of positions which only alter the maximum exposure increase to a small degree. Contrast this data to the two curves in FIG. 6 (1.0 ND on ⅓ Ends and 0.2 ND on ⅓ Ends). The data in FIG. 6 shows a greater dependence on the density of the filter material than its position (when placed at the ends) in regards to the maximum exposure increase.

In motion picture color printing, there are usually three records to record simultaneously, i.e., red, green and blue. This invention can alter the exposure profile of any record independently of the others by using colored filters instead of a neutral density filter material. For example, the blue record may be decreased during a fade/dissolve by using a yellow filter of the desired density in the center of the device (in the photographic art, modulation of a specific record is usually made by filtration by the complementary color, i.e., the blue record is usually modulated by a yellow filter). Further, additional neutral density may be used in the device, at the same location as the color filter material or at other locations, to alter the overall neutral profile.

The advantage of this invention is that the prior practices in the industry do not allow an easy method to change the exposure profile of either the neutral or the individual color records. Due to the previously mentioned factors which influence the fade/dissolve, this device can provide a control method to assure the desired result. With the proper size and density (either neutral, colored or a combination) of the filtration the desired exposure profile can be obtained.

For example, in order to correct for a deficiency in a print film which upon a linear fade and dissolve has the characteristic of producing a cyan increase of 0.15 in density in the center of the fade/dissolve, and which film has a gamma (a contrast metric which relates density change to an exposure change) of 3.0, the following described filter is used. The 0.15 density results from a 0.05 Log Exposure increase as a result of the 3.0 gamma. In order to compensate for such a relative cyan density increase, a non-uniform filter is designed with filter material with a density of 0.20 cyan placed in the center ⅓ of the filter. Use of such a filter in accordance with the invention will exhibit a decrease in exposure near the center of the fade/dissolve of approximately 0.05 Log Exposure when used in a motion picture printer with a fader.

As another example, in order to correct for a deficiency in a film having a gamma of 3.0 and which upon a linear fade has the characteristic of producing a magenta decrease of 0.10 in density in the center of the fade/dissolve in addition to a 0.10 neutral density decrease, the following described filter is used. With a gamma of 3.0, the neutral exposure decrease is approximately 0.033 Log Exposure, and the additional magenta loss is approximately 0.033 Log Exposure. To compensate for this effect, a non-uniform filter is designed with neutral filter material with a density of approximately 0.15 and magenta filter material with a density of approximately 0.15 placed such that the two ends are ⅓ covered and the center is ⅓ clear. Such a filter when used in a motion picture printer with a fader in accordance with the invention will exhibit a relative increase in exposure near the center of the fade/dissolve of approximately 0.033 Log Exposure. The choice of the density of the filter material in the above examples is based on the normal commercial availability of 0.05 increments in neutral and colored density materials. Custom filters may be fabricated with any non-standard density to fit an application.

Figure 8:
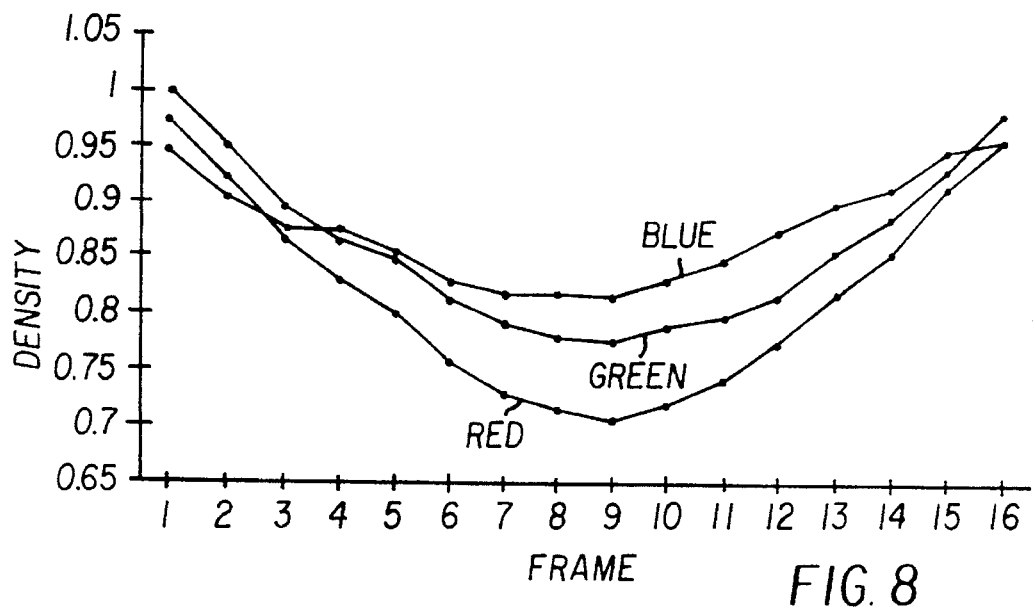
FIG. 8 is a graph of density over a 16 frame fade and dissolve depicting red, green and blue density variations obtained without use of a non-uniform filter.

The set of curves in FIG. 8 illustrates the density deviation across a real 16 frame linear fade and dissolve printed onto Eastman Color Print Film 5386. The initial densities of frame 1 should desirably hold for the duration of the 16 frame fade in order to maintain constant overall image density. In this example, all three curves show a density decrease, with the red decrease being the largest. The effect is largest in the middle of the fade/dissolve, where the contribution of each exposure is nearly one half. This results in an overall density fade and a yellow colr shift during the fade and dissolve.

Figure 9:
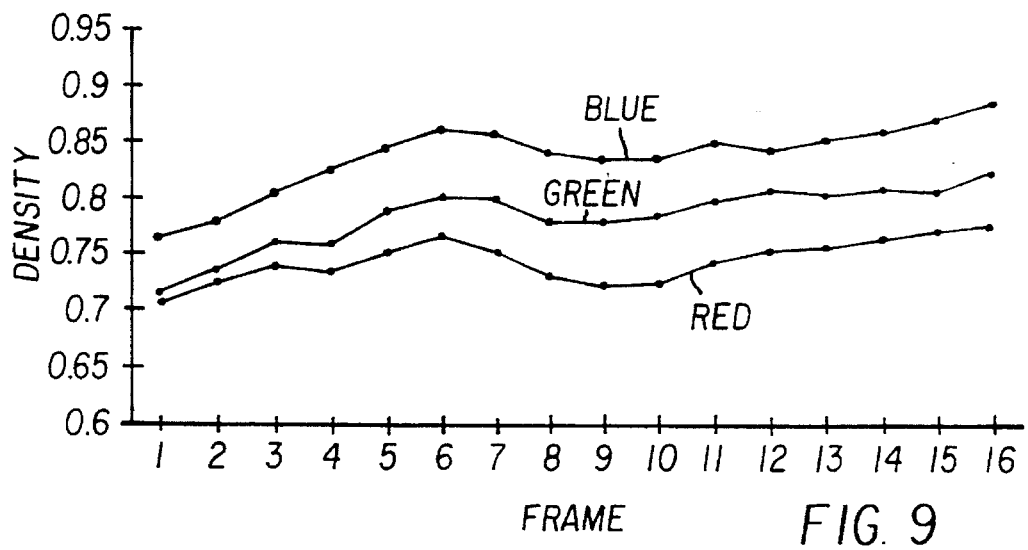
FIG. 9 is a graph of density over a 16 frame fade and dissolve for the same print material as in FIG. 8 depicting the red, green and blue density variations obtained with use of a non-uniform filter in accordance with the invention.

The set of curves in FIG. 9 illustrates the decrease in density deviation across a fade/dissolve with the use of a non-uniform exposure correction filter. The filter used was constructed from a piece of 50 mm square plain glass having 18 mm wide strips of both neutral and blue gelatine filter material over each end of the glass square, leaving the central 14 mm of the glass square clear (substantially as illustrated in FIG. 2a). The gelatine filter material used was a 0.15 neutral density filter material and a CC 20 Blue (standard photographic color compensating blue gelatine filter) filter material. The initial densities of frame 1 hold much better for the duration of the 16 frame fade and dissolve. In this example, all three curves show a density difference due to initial balance, however the overall density change is small.

Any filter material capable of transmitting the desired spectral regions of the light spectrum may be used in forming the non-uniform filters of the present invention, including, e.g., dyed glass, gelatine filters (e.g., Kodak Gelatine Filters), Wratten filters, and custom filters made from organic or inorganic dyestuffs as are well known in the filter art. Dichroic filter materials transmit selected wavelengths of light and reflect the remaining wavelengths. Their construction is described, e.g., in Henn U.S. Pat. No. 3,085,468 and Pearson U.S. Pat. No. 4,355,888. Typically, they comprise alternating layers of materials of different refractive indices. In the case of dichroic filters selected for use in the present invention, the filter would reflect a particular band, or bands, of radiation and would transmit the remainder of the radiation. Dye filter materials absorb selected wavelengths of light and transmit the remainder. Dye filters used elsewhere in photography generally have an absorption profile that is broader than the bands reflected by a dichroic filter. In the case of dye filters selected for use in the present invention, the filter would absorb a desired band, or bands, of radiation and transmit the rest. Because of their relatively broader absorption profiles, combinations of absorber dyes are effective to provide a neutral density across the visible spectrum. Regardless of the actual filter material used in forming the non-uniform filter used in accordance with the invention, it is selected so as to remove from the output of the printer light source one or more wavelength bands of radiation, or decrease the neutral intensity, non-uniformly in one direction of the filter.

The original record to be reproduced is preferably an image composed of sub-records having radiation patterns in different regions of the spectrum. Typically it will be a multicolor record composed of sub-records formed from cyan, magenta and yellow dyes. The principle by which such materials form a color image are described in James, The Theory of the Photographic Process, Chapter 12, Principles and Chemistry of Color Photography, pp 335–372, 1977, Macmillan Publishing Co. New York, and .suitable materials useful to form original records are described in *Research Disclosure*, December, 1987, Item 17643, published by Industrial Opportunities Ltd., Homewell Havant, Hampshire, P09 1EF, United Kingdom, and *Research Disclosure*, September 1994, Item 36544, published by Kenneth Mason Publications, Ltd., Emsworth, Hampshire P010 7DQ, England. Materials in which such images are formed can be exposed to an original scene in a camera, or can be duplicates formed from such camera origination materials. The preferred materials, with which the present invention is contemplated being used, are original records formed in color negative intermediate films such as those identified by the tradenames Eastman Color Intermediate Films 2244, 5244 and 7244. The peak absorptions for such films are in the blue region of the spectrum at about 440 nm, in the green region of the spectrum at about 540 nm, and in the red region of the spectrum at about 680 nm. It also will be observed that these peaks correspond approximately to the output peaks of an additive lamphouse.

The light sensitive material on to which the original record is illuminated, and in which the copy is reproduced, preferably is a light sensitive material of the type described above in connection with the original record. It can comprise a support bearing light sensitive layers sensitized to two or more regions of the electromagnetic spectrum. Typically, it is a light sensitive silver halide material containing units sensitive to each of the red, green and blue regions of the visible spectrum. Such materials are described in the Research Disclosure publications cited above. It is within the scope of this invention for the light sensitive material to be comprised of another known light sensitive material and/or for the material to be sensitive to one or more regions of the electromagnetic spectrum outside the visible, such as the infra red region of the spectrum. Preferred light sensitive materials include the color intermediate films identified above as well as print films such as Eastman Color Print Films 5385, 5386 and 2386. Once these materials are exposed in accordance with this invention, they may be conventionally processed to form a visible image in the material.

This invention has been described in detail with particular reference to preferred embodiments thereof. It will be understood that variations and modifications can be made within the spirit and scope of the invention.

What is claimed is:

1. A system for fading and dissolving two original color record scenes together on a light sensitive material, the system comprising:

a) a first color record;

b) a second color record;

c) a motion picture printer comprising a light source, a fader slit, a non-uniform filter and an exposing slit; and d) a light sensitive material onto which the first and second color records can be illuminated by means of the light source;

wherein the non-uniform filter is non-uniform in one direction thereof with respect to its ability to filter light from the light source, said filter being positioned so as to alter the relative intensity and/or spectral characteristics of light trasmitted to the light sensitive material as the fader slit is opened and closed during a fade and dissolve printing process.

2. A system according to claim 1, wherein each of the first and second color records has two or more sub-records with wavelength peaks in different regions of the electromagnetic spectrum.

3. A system according to claim 2, wherein each of the first and second color records are comprised of cyan, magenta and yellow sub-records, and the light sensitive material is sensitized to the red, green and blue regions of the spectrum.

4. A system according to claim 2, wherein the non-uniform filter is uniform in a second direction thereof with respect to its ability to filter light from the light source, and the filter is positioned so as to transmit uniformly filtered light across the width of light sensitive material.

5. A system according to claim 4, wherein the non-uniform filter has uniform areas on either ends and in the center, and the center area has a lower neutral density than the end areas.

6. A system according to claim 5, wherein either the end areas or the center area has a spectrally selective density.

7. A system according to claim 4, wherein the non-uniform filter has uniform areas on either ends and in the center, and the center area has a higher neutral density than the end areas.

8. A system according to claim 7, wherein either the end areas or the center area has a spectrally selective density.

9. A system according to claim 4, wherein the non-uniform filter has uniform areas on either ends and in the center, and either the end areas or the center area has a spectrally selective density.

10. A system according to claim 4, wherein the non-uniform filter has a gradient area wherein the density constantly changes from a higher density to a lower density.

11. A system according to claim 10, wherein the non-uniform filter has a uniform area in the center and a gradient area on either end.

12. A process for producing a fade and dissolve motion picture image, comprising the steps of:
 a) providing a first color record;
 b) providing a second color record;
 c) providing a light sensitive material onto which the first and second color records can be illuminated; and
 d) sequentially illuminating at least a portion of each of the first and second color records onto a portion of the light sensitive material with a motion picture printer light source to form two superimposed exposures in the light sensitive material, wherein the light intensity during the illumination is ramped down for one of the color records and ramped up for the other color record by controlling the width of a fader slit in the motion picture printer,
 wherein a non-uniform filter which is non-uniform in one direction thereof with respect to its ability to filter light from the light source is positioned so as to alter the relative intensity and/or spectral characteristics of light transmitted to the light sensitive material as the fader slit is opened and closed during a fade and dissolve printing process.

13. A process according to claim 12, wherein the non-uniform filter is uniform in a second direction thereof with respect to its ability to filter light from the light source, and the filter is positioned so as to transmit uniformly filtered light across the width of light sensitive material.

14. A process according to claim 13, wherein the non-uniform filter has uniform areas on either ends and in the center, and the center area has a lower neutral density than the end areas.

15. A process according to claim 14, wherein either the end areas or the center area has a spectrally selective density.

16. A process according to claim 13, wherein the non-uniform filter has uniform areas on either ends and in the center, and the center area has a higher neutral density than the end areas.

17. A process according to claim 16, wherein either the end areas or the center area has a spectrally selective density.

18. A process according to claim 13, wherein the non-uniform filter has uniform areas on either ends and in the center, and either the end areas or the center area has a spectrally selective density.

19. A process according to claim 13, wherein the non-uniform filter has a gradient area wherein the density constantly changes from a higher density to a lower density.

20. A process according to claim 19, wherein the non-uniform filter has a uniform area in the center and a gradient area on either end.

* * * * *